No. 871,912. PATENTED NOV. 26, 1907.
F. R. CARPENTER.
APPARATUS FOR OBTAINING SULFUR FROM FURNACE GASES.
APPLICATION FILED MAR. 19, 1906.
3 SHEETS—SHEET 1.
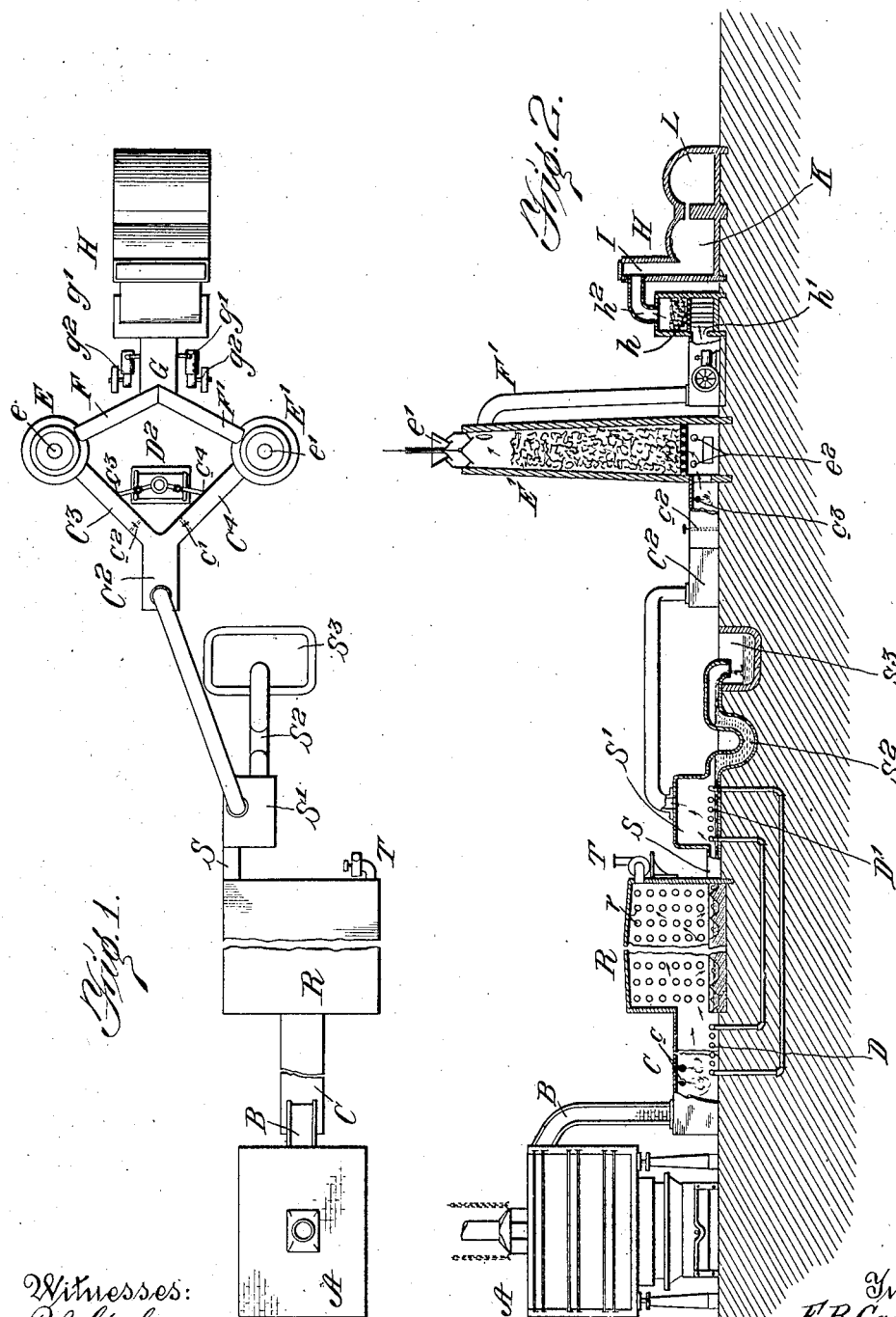
Witnesses:
P. J. Gathmany
E. A. Brewer
Inventor:
F. R. Carpenter
By his Attorneys:
Baldwin & Wight No. 871,912. PATENTED NOV. 26, 1907.
F. R. CARPENTER.
APPARATUS FOR OBTAINING SULFUR FROM FURNACE GASES.
APPLICATION FILED MAR. 19, 1906.
3 SHEETS—SHEET 2.
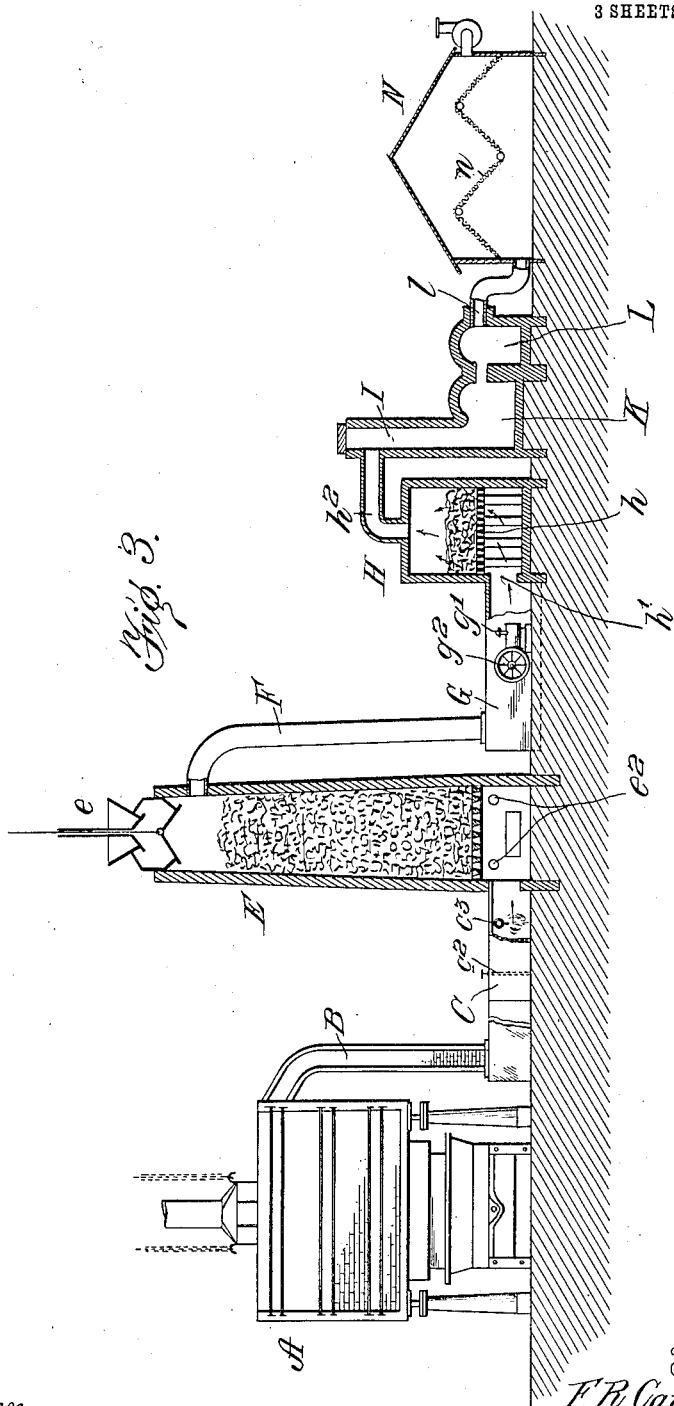

No. 871,912. PATENTED NOV. 26, 1907.
F. R. CARPENTER.
APPARATUS FOR OBTAINING SULFUR FROM FURNACE GASES.
APPLICATION FILED MAR. 19, 1906.
3 SHEETS—SHEET 3.
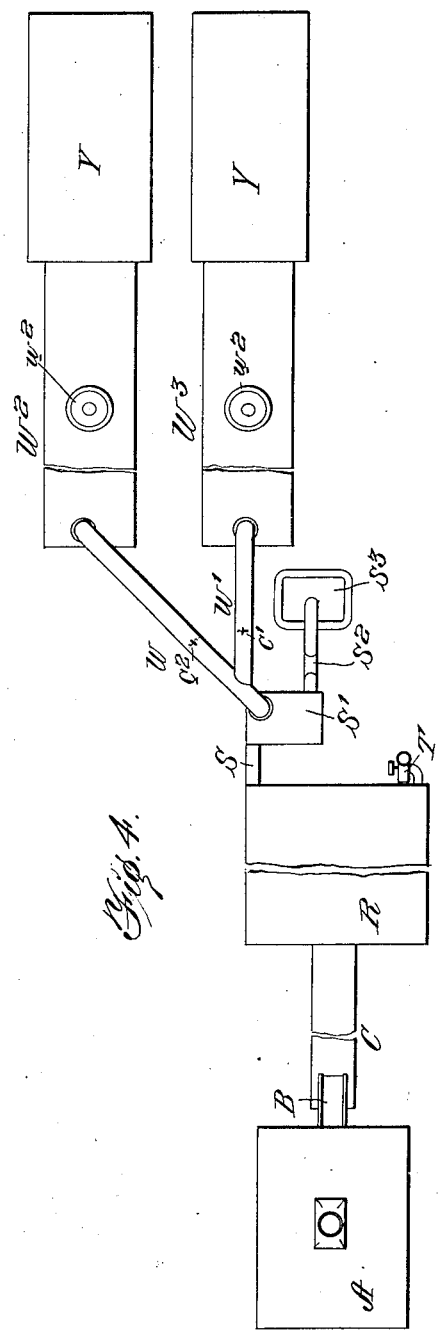
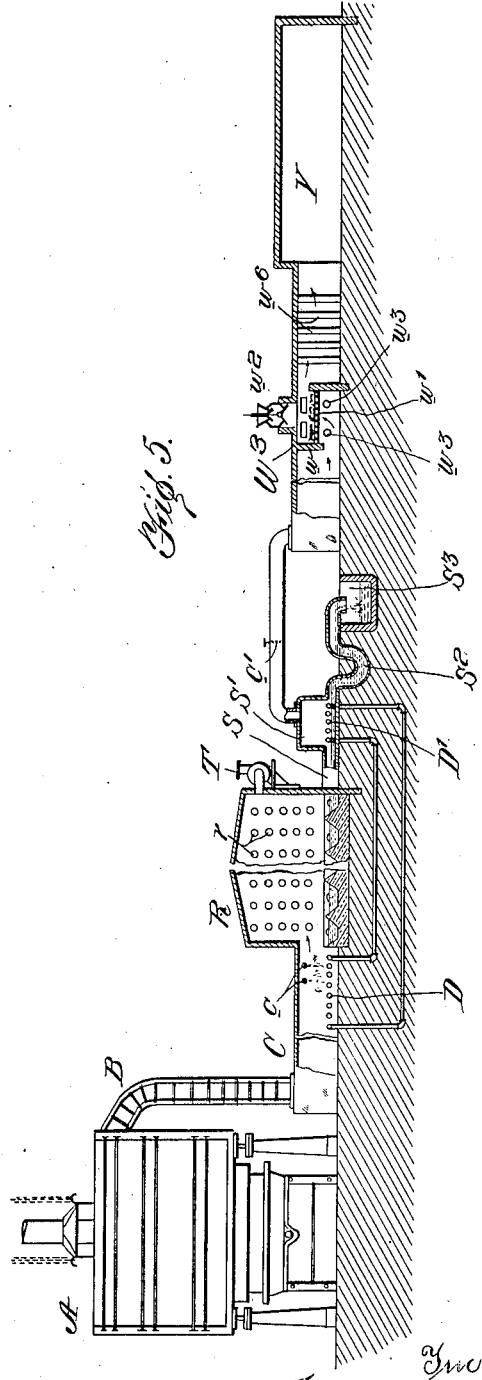
Witnesses:
Paul J. Gathmann
E. B. Bremer
Inventor:
F. R. Carpenter
By his Attorneys:
Baldwin & Wight

UNITED STATES PATENT OFFICE.

FRANKLIN R. CARPENTER, OF DENVER, COLORADO, ASSIGNOR OF ONE-FOURTH TO ARTHUR HOWE CARPENTER, ONE-EIGHTH TO CRANSTON HOWE CARPENTER, AND ONE-EIGHTH TO MALCOLM HOWE CARPENTER, ALL OF DENVER, COLORADO.

APPARATUS FOR OBTAINING SULFUR FROM FURNACE-GASES.

No. 871,912.  Specification of Letters Patent.  Patented Nov. 26, 1907.

Application filed March 19, 1906. Serial No. 306,901.

*To all whom it may concern:*

Be it known that I, FRANKLIN R. CARPENTER, a citizen of the United States, residing in Denver, in the county of Denver and State of Colorado, have invented a new and useful Apparatus for Obtaining Sulfur from Sulfurous Oxid, of which the following is a specification.

In calcining and smelting sulfid ores there is contained in the gases given off by the furnaces large quantities of sulfurous oxid, ($SO_2$). The usual practice in this country is to discharge such furnace gases into the atmosphere with the result that all vegetation in the surrounding country is destroyed. The presence of this gas in the atmosphere is also injurious to animal life in the region in which the furnace is located.

The principal objects of my invention are, first to prevent the discharge of this injurious gas into the atmosphere, and second, to obtain sulfur therefrom which is a product of commercial value.

In carrying out my process in the preferred way, the sulfurous oxid is first concentrated as by so doing the volume of gases to be handled in the succeeding operations is lessened which is more convenient, and the fuel consumed is lessened and greater purity is obtained in the product. This concentration is preferably effected by cooling the gases which come from the furnace preferably to a temperature of 0° C. or below. It is preferable, before cooling, to add to the gases as much moisture as possible as it aids in the separation from the gases of the metallic bodies, which will usually be present, and also of the sulfurous oxid and avoids the necessity of cooling the gases to the very low temperature above specified.

The condensed sulfurous oxid, or usually sulfurous acid, is subjected to heat to obtain gaseous sulfurous oxid which is then further treated in the manner hereinafter described.

Although, as I have stated, it is preferable to concentrate the sulfurous oxid and treat it in the concentrated form, I may also operate on the gas as it comes direct from the furnace, being then mixed with other gases including the products of combustion. When so doing it is preferable to cool the furnace gases somewhat and permit them to deposit solid particles by carrying them through a passage-way of suitable length. The sulfurous oxid from the furnace gases may then be treated in various ways.

According to one method, whether the sulfurous oxid is in a concentrated form, or is still mixed with the rest of the furnace gases, it has a regulated quantity of steam added to it and the mixture is then subjected to a reducing agent at a high temperature. The quantity of steam to be added will vary with the quantity of the sulfurous oxid. The reducing agent under the conditions stated will effect a reduction of both the sulfurous and hydrogen oxids with the formation of hydrogen sulfid. The re-action taking place in accordance with the equation $$2SO_2 + 2H_2O + 3C = 2H_2S + 3CO_2$$

or $$SO_2 + H_2O + 2C = H_2S + CO_2 + CO$$

or $$SO_2 + H_2O + 3C = H_2S + 3CO$$

The hydrogen sulfid produced in the above manner is then carried forward and mingled with a graduated quantity of air forced into contact with hot iron oxid. The supply of air should be sufficient to supply oxygen enough to satisfy the hydrogen. The effect of oxygen aided by the catalytic action of the iron oxid is to separate the hydrogen from the sulfur according to the following equations, $$H_2S + O = S + H_2O.$$

The gases passing from the iron oxid are cooled and the sulfur collected by means of settling chambers or filters, or both.

In conducting the process it is preferable, in order to obtain satisfactory results, to supply steam sufficient to fully decompose the sulfurous oxid, as otherwise sulfur would be separated too early, but if an excess of steam be admitted no serious harm results although it will tend to consume and cool the reducing agent more rapidly and will necessitate a larger supply of air in the later operation. The quantity of air to be admitted is of greater importance since if insufficient is admitted the hydrogen sulfid will not be completely decomposed and if air be admitted in too great a quantity some of the sulfur will be reoxidized. When operating on concentrated sulfurous oxid the quantities of steam and air needed are readily calculated, allowance being made, however, for some watery vapor which will be carried by the sulfurous oxid, as it will not be dry. When operating on the diluted gas as it comes direct from the furnace an analysis of the ore with a knowledge of the volume of the blast supplied to the furnace will enable the quantities of steam and air to be calculated with sufficient accuracy, or an analysis can be made of the furnace gases. A check on this calculation can be had by observing the composition of the gases coming from the settling or filtering chamber, the presence of either hydrogen sulfid or sulfurous oxid in these gases indicating an improper operation. After the apparatus has been adjusted no further adjustment will ordinarily be necessary as long as the grade of ore is not changed, but for safety an observation of the character of the gases coming from the settling or filtering chamber may be made from time to time.

In working it will be found that the ferric oxid is gradually transformed into ferrous sulfid, but this change does not affect its action, although natural ferric sulfid could not be substituted for the iron oxid.

According to another way of carrying out my invention, I may first condense or concentrate the sulfurous oxid, in the manner before described, and then pass it through a reducing atmosphere as through or over a bed of glowing coke or other fuel whereby the sulfurous gases are reduced to sulfur, which latter, after cooling, becomes solid and may be settled out in a settling chamber.

In the accompanying drawings, Figure 1 shows a plan view of an apparatus which may be employed for carrying out my invention, and Fig. 2 is a view partly in elevation and partly in section thereof. Fig. 3 is a view partly in elevation and partly in section showing a modified form of apparatus in which the gases are not concentrated in the manner illustrated in Figs. 1 and 2. Fig. 4 is a plan view of another modified form of apparatus, and Fig. 5 is a view thereof partly in elevation and partly in vertical section.

In Figs. 1, 2 and 3, A, indicates a furnace or roaster of any usual or desired form. As shown it is a blast furnace such as is commonly employed in smelting pyritic ores. B, is a down-comer by which the furnace gases are conducted to a flue, C, in which may settle solid particles carried mechanically by the gases and also in which they are cooled. In the preferred form of the apparatus shown in Figs. 1 and 2 the flue, C, is provided with one or more water sprays, as shown at $c$, of any ordinary construction so as to insure a complete saturation of the gases with watery vapor. This flue, C, opens directly into the refrigerating chamber, R, which is of considerable size and length built with walls of low conductivity and is provided throughout its length with connected transverse pipes $r$ through which a refrigerating medium is caused to circulate. These pipes may be connected together to form a single or multiple circuits as desired. The bottom of the chamber is formed with channels which at one end open by an overflow into a conduit, S, which extends along one side of the chamber. The purpose of the over-flow opening is to hold back, to some extent, solid particles which fall to the bottom of the chamber. To insure a circulation, prevent back draft, and carry off the uncondensed gases, an exhaust fan, T, is provided at the end of the chamber, R. If desired the refrigerating chamber may be duplicated.

The flue, C, may be provided at any desired point with a coil of pipes, D, as shown in Fig. 2. By circulating water in this pipe system heat may be generated to be used in distilling sulfurous oxid in order to obtain it in a concentrated form. As shown in Fig. 1, the chamber, S', is provided interiorly with a coil, D', connected with the coil, D, by which the sulfurous oxid is distilled from the contained sulfurous acid while the gases in the flue are to some extent cooled. The roof of the chamber, S', is connected with a discharge pipe which discharges into a chamber, $C^2$, which in turn opens into diverging flues, $C^3$, $C^4$. The waste water from the compartment, S, passes out through a trap, $S^2$, to a suitable receptacle, $S^3$.

When the construction shown in Fig. 3 is employed and sulfurous oxid is treated in the condition in which it comes from the furnace, the flue. C. opens directly into the diverging flues. These flues, are provided with valves or dampers, $c'$, $c^2$, and also near their ends with valved steam inlets, $c^3$, $c^4$, connected with the steam generator, $D^2$. These flues, $C^3$, $C^4$, terminate and open into the bases of coke towers, E, E', which as shown are cylindrical, but they may have any other form in cross section and are adapted to be filled and fed from time to time with coke through the bell-hoppers, $e$ and $e'$. These towers are provided at their bottoms with twyers, $e^2$, by which the necessary air can be supplied from time to time as may be necessary to maintain the coke incandescent. The object in using the two towers, E, and E', and the two branches, $C^3$ and $C^4$, is that one may always be in an operative condition. It will be found in practice that the gases delivered to the towers not only cannot support combustion, but will cool down the coke below incandescence if continued long enough. It is therefore necessary to intermit the supply of the gases to a tower and provide it with an air blast during the intermission. By the use of the diverging flues, $C^3$ and $C^4$ provided with valves or dampers, $c'$, $c^2$, and the two towers, the current can be shifted from one to the other tower and the process can therefore be conducted continuously.

From the tops of the towers, E and E' down-comers F and F' connect with a common passage, G, of sufficient length to effect a material cooling of the gases. This passage, G, opens into the iron oxid container or Claus kiln, H, and to which it conveys the gases. As shown, it is provided with a valved inlet, $g'$, on each side through which air is forced from air pumps, $g^2$. If desired, however, air could be admitted at the bottom of the iron oxid container or kiln, H. The iron oxid container or kiln comprises a chamber rectangular in plan except for its inlet and outlet and subdivided by a horizontal perforated plate, $h$, of earthenware or other suitable material, on which rests the iron oxid which is preferably mixed with some neutral substances to prevent the particles of iron oxid from fritting together. The iron oxid may rest directly on the plate, but preferably a layer of broken fire brick will be interposed.

The passage, G, opens into the chamber at one end beneath the plate, $h$ at $h'$, and at the other end of the chamber and above the plate, $h$, is located the outlet, $h^2$.

At the outset it will be necessary to heat the iron oxid and for this purpose suitable heating means may be provided, but after starting it will be found that the heat of the re-action will be sufficient.

Connected with the outlet, $h^2$, is a passage, I, which extends to the condensing chamber, K. This chamber is of large size and has an outlet in the top of the wall opposite the inlet which outlet communicates with a second condensing chamber, L. In the chamber, K, the greater portion of sulfur condenses in a liquid form and may be drawn off at the bottom. A less proportion of sulfur, together with the products of combustion formed in the first re-action and the steam formed in the second re-action, pass into the second condensing chamber, L, in which the remaining sulfur condenses as flowers.

When treating sulfurous oxid without concentration the proportion of other gases relative to the sulfur is so great that the particles are liable to be carried forward mechanically. To prevent loss of such sulfur, I connect to the outlet $l$ a pipe leading to the bottom of a filtering chamber, N. Extending transversely of the chamber is stretched cloth or like filtering material, $n$, which may be arranged in a zig-zag fashion as shown. An outlet connected to a fan is located at the top of the chamber.

While I have described what I believe to be the best form of apparatus and the best manner of operating it, other apparatus may be employed for carrying out my process.

I have described the mixed sulfurous oxid and steam as passing upward through a column of glowing coke, but they may be brought into contact with the reducing agent at a sufficiently high temperature in other ways, as by passing them over a bed of glowing fuel. It will also be evident that instead of iron oxid, other catalytic oxids may be used which will act in the same way, many being well known.

Referring now to Figs. 4 and 5, it will be seen that the furnace and the condensing apparatus as well as the means for separating sulfurous oxid from sulfurous acid or water is substantially the same as that shown in Figs. 1 and 2. After leaving the chamber, S' the sulfurous oxid passes through valved branch pipes, W, W', to reducing chambers, $W^2$, $W^3$, one of which is shown in section in Fig. 5. Extending rearwardly from the wall, $w$, of each chamber is a furnace grate, $w'$. The grate is adapted to support a bed of incandescent coke which may be fed thereto from an ordinary bell-hopper, $w^2$. Beneath each grate is located a twyer or twyers, $w^3$, to be used from time to time as necessary to maintain the coke incandescent and an outlet through which ash may be removed may be provided. Beyond the reducing chambers are checkerwork partitions, $w^6$ of fire-brick located in a passage leading from each reducing chamber to a condensing chamber, Y. The concentrated sulfurous oxid passes through the reducing chamber and is reduced, and in the condensing chamber, Y, the gases will be cooled and condensed and sulfur in solid form will be deposited.

I claim:—

1. The herein described apparatus for obtaining sulfur from furnace gases containing sulfurous oxid, comprising a dust chamber in which solid particles carried over mechanically may be deposited, coke towers with which the dust chamber communicates, valves for shutting off communication between the towers and the dust chamber, means for admitting steam with the gases to the coke towers, a cooling chamber with which the towers communicate, an iron oxid container communicating with said cooling chamber, means for admitting air to said iron oxid container, and a collecting chamber communicating with the iron oxid container.

2. The herein described apparatus for obtaining sulfur from sulfurous oxid contained in furnace gases comprising a refrigerating chamber, means for delivering furnace gases thereto, a coke tower, means for conveying sulfurous oxid from the refrigerating chamber to the bottom of the coke tower, means for delivering steam with the sulfurous acid, means for maintaining the coke in the tower incandescent, an iron oxid container, means for conducting gases from the top of the coke tower to the bottom of the iron oxid container, means for delivering air to the bottom of the container and means for carrying off and collecting the sulfur.

3. The herein described apparatus, comprising a refrigerating chamber, means for delivering furnace gases thereto, means for separating the fixed gases from the sulfurous oxid and the water deposited in the refrigerating chamber, means for evaporating the sulfurous oxid out of the water containing it, means for subjecting the sulfurous oxid thus concentrated to the action of a reducing agent at a high temperature, and means for further treating the resulting gas to obtain sulfur in a solid form.

4. The apparatus herein described, comprising a furnace, a cooling chamber connected therewith and receiving furnace gases therefrom equipped with means for condensing the sulfurous oxid contained in said furnace gases, means for collecting the condensed oxid, an evaporating chamber to which the water containing the oxid is conveyed, a coil of heating pipes contained in said evaporating chamber, another coil in the flue connection between the furnace and the cooling chamber, means for circulating a fluid through the coils whereby the furnace gases are to some extent cooled before reaching the cooling chamber and the coil in the evaporating chamber is heated sufficiently to vaporize off the sulfurous oxid, means for carrying of the water from the evaporating chamber and means for further treating the concentrated sulfurous oxid to obtain sulfur therefrom.

5. The herein-described apparatus for obtaining sulfurous oxid from furnace gases comprising a dust chamber in which particles carried over mechanically may be deposited, a coil of pipes containing water in said chamber, a refrigerating chamber into which the gases pass after the dust is deposited, a chamber for distilling liquid containing the deposited sulfurous oxid, a coil of water-pipes in said chamber connected with the coil in the dust-settling chamber whereby the heat from the settling chamber is conveyed to the distilling chamber and vice versa, the lower temperature of the distilling chamber is communicated to the settling chamber, whereby the gases are to some extent cooled before entering the refrigerating chamber and means for carrying off and further treating the sulfur gases from the distilling chamber.

In testimony whereof, I have hereunto subscribed my name.

FRANKLIN R. CARPENTER.

Witnesses:
LLOYD B. WIGHT,
CHARLES F. EARLY.